US008522344B2

(12) United States Patent
Ormazabal et al.

(10) Patent No.: US 8,522,344 B2
(45) Date of Patent: Aug. 27, 2013

(54) THEFT OF SERVICE ARCHITECTURAL INTEGRITY VALIDATION TOOLS FOR SESSION INITIATION PROTOCOL (SIP)-BASED SYSTEMS

(75) Inventors: Gaston S. Ormazabal, New York, NY (US); Henning G. Schulzrinne, Leonia, NJ (US); Sarvesh Nagpal, New York, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 967 days.

(21) Appl. No.: 11/955,967

(22) Filed: Dec. 13, 2007

(65) Prior Publication Data
US 2009/0007220 A1 Jan. 1, 2009

Related U.S. Application Data

(60) Provisional application No. 60/947,177, filed on Jun. 29, 2007.

(51) Int. Cl.
*G06F 11/00* (2006.01)

(52) U.S. Cl.
USPC .............................................. 726/22; 726/23

(58) Field of Classification Search
USPC ......... 726/1–4, 10–15, 22–25; 713/150–154, 713/168
See application file for complete search history.

(56) References Cited

U.S. PATENT DOCUMENTS

| | | | |
|---|---|---|---|
| 5,414,704 A | 5/1995 | Spinney | |
| 5,465,286 A | 11/1995 | Clare et al. | |
| 5,473,607 A | 12/1995 | Hausman et al. | |
| 5,828,653 A | 10/1998 | Goss | |
| 5,859,980 A | 1/1999 | Kalkunte | |
| 5,909,686 A | 6/1999 | Muller et al. | |
| 5,936,962 A | 8/1999 | Haddock et al. | |
| 5,991,270 A | 11/1999 | Zwan et al. | |
| 6,154,775 A | 11/2000 | Coss et al. | |
| 6,175,902 B1 | 1/2001 | Runaldue et al. | |
| 6,680,089 B2 | 1/2004 | Miyake et al. | |
| 6,701,346 B1 | 3/2004 | Klein | |
| 6,707,817 B1 | 3/2004 | Kadambi et al. | |
| 6,816,910 B1 | 11/2004 | Ricciulli | |
| 6,826,616 B2 | 11/2004 | Larson et al. | |
| 6,880,089 B1 | 4/2005 | Bommareddy et al. | |
| 6,920,107 B1 | 7/2005 | Qureshi et al. | |
| 6,930,598 B2 | 8/2005 | Weiss | |
| 6,934,756 B2 * | 8/2005 | Maes | 709/227 |
| 7,007,299 B2 | 2/2006 | Ioele et al. | |
| 7,072,291 B1 | 7/2006 | Jagadeesan et al. | |
| 7,076,393 B2 | 7/2006 | Ormazabal et al. | |
| 7,254,832 B1 | 8/2007 | Christie | |
| 7,340,166 B1 | 3/2008 | Sylvester et al. | |
| 7,385,927 B2 | 6/2008 | Gygi et al. | |
| 7,385,931 B2 | 6/2008 | Magnaghi et al. | |

(Continued)

OTHER PUBLICATIONS

Rosenberg, et al., "SIP: Session Initiation Protocol", Internet Engineering Task Force, Request for Comments 3261, Jun. 2002.

(Continued)

*Primary Examiner* — Hosuk Song

(57) ABSTRACT

A device prevents theft of service attacks on a Session Initiation Protocol (SIP)-based device using an identity assurance protection mechanism, a multiple end-points protection mechanism, and an intrusion detecting protection mechanism.

25 Claims, 12 Drawing Sheets

(56) References Cited

U.S. PATENT DOCUMENTS

| | | |
|---|---|---|
| 7,421,734 B2 | 9/2008 | Ormazabal et al. |
| 7,440,573 B2 | 10/2008 | Lor et al. |
| 7,499,405 B2 | 3/2009 | Gilfix et al. |
| 7,634,249 B2 | 12/2009 | Hahn et al. |
| 7,653,938 B1 | 1/2010 | Touitou et al. |
| 7,672,336 B2 | 3/2010 | Bharrat et al. |
| 7,716,725 B2 * | 5/2010 | Xie .................................. 726/11 |
| 7,721,091 B2 | 5/2010 | Iyengar et al. |
| 2002/0083187 A1 | 6/2002 | Sim et al. |
| 2002/0112073 A1 | 8/2002 | MeLampy et al. |
| 2003/0055931 A1 | 3/2003 | Cravo De Almeida et al. |
| 2003/0076780 A1 | 4/2003 | Loge et al. |
| 2003/0086425 A1 | 5/2003 | Bearden et al. |
| 2003/0093562 A1 | 5/2003 | Padala |
| 2003/0093563 A1 | 5/2003 | Young et al. |
| 2003/0115321 A1 | 6/2003 | Edmison et al. |
| 2003/0117961 A1 | 6/2003 | Chuah et al. |
| 2003/0126464 A1 | 7/2003 | McDaniel et al. |
| 2003/0135639 A1 | 7/2003 | Marejka et al. |
| 2003/0165136 A1 | 9/2003 | Cornelius et al. |
| 2003/0195861 A1 | 10/2003 | McClure et al. |
| 2004/0001443 A1 | 1/2004 | Soon et al. |
| 2004/0013086 A1 | 1/2004 | Simon et al. |
| 2004/0028035 A1 | 2/2004 | Read |
| 2004/0034793 A1 | 2/2004 | Yuan |
| 2004/0039938 A1 | 2/2004 | Katz et al. |
| 2004/0068668 A1 | 4/2004 | Lor et al. |
| 2004/0128554 A1 | 7/2004 | Maher et al. |
| 2004/0133772 A1 | 7/2004 | Render |
| 2004/0136379 A1 | 7/2004 | Liao et al. |
| 2004/0208186 A1 | 10/2004 | Eichen et al. |
| 2004/0236966 A1 | 11/2004 | D'Souza et al. |
| 2004/0244058 A1 | 12/2004 | Carlucci et al. |
| 2004/0255156 A1 | 12/2004 | Chan et al. |
| 2005/0018618 A1 | 1/2005 | Mualem et al. |
| 2005/0050377 A1 | 3/2005 | Chan et al. |
| 2005/0076235 A1 | 4/2005 | Ormazabal et al. |
| 2005/0165917 A1 | 7/2005 | Le et al. |
| 2005/0232229 A1 | 10/2005 | Miyamoto et al. |
| 2006/0007868 A1 | 1/2006 | Shinomiya |
| 2006/0075084 A1 | 4/2006 | Lyon |
| 2006/0077981 A1 | 4/2006 | Rogers |
| 2006/0146792 A1 | 7/2006 | Ramachandran et al. |
| 2006/0227766 A1 | 10/2006 | Mickle et al. |
| 2007/0022479 A1 | 1/2007 | Sikdar et al. |
| 2007/0110053 A1 | 5/2007 | Soni et al. |
| 2007/0118894 A1 | 5/2007 | Bhatia |
| 2007/0121596 A1 | 5/2007 | Kurapati et al. |
| 2007/0192863 A1 | 8/2007 | Kapoor et al. |
| 2008/0037447 A1 | 2/2008 | Garg et al. |
| 2008/0040801 A1 | 2/2008 | Buriano et al. |

OTHER PUBLICATIONS

Kuthan, et al., "Middlebox Communication: Framework and Requirements", Internet Engineering Task Force, draft-kuthanmidcom-framework-00.txt, Nov. 2000, pp. 1-23, Nov 1, 2000.

* cited by examiner

THEFT OF SERVICE ARCHITECTURAL INTEGRITY VALIDATION TOOLS FOR SESSION INITIATION PROTOCOL (SIP)-BASED SYSTEMS

RELATED APPLICATION

This application claims priority under 35 U.S.C. §119 based on U.S. Provisional Patent Application No. 60/947,177, filed Jun. 29, 2007, the disclosure of which is incorporated by reference herein in its entirety.

BACKGROUND

Session Initiation Protocol (SIP) is an application-layer control (i.e., signaling) protocol for creating, modifying, and terminating sessions with one or more participants. These sessions may include Internet-based telephone calls, multimedia distribution, multimedia conferences, instant messaging conferences, interactive voice response (IVR), automated and manual operator services, automatic call distribution, call routing, etc. SIP invitations or INVITES may be used to create sessions and may carry session descriptions that allow participants to agree on a set of compatible media types. SIP may use proxy servers to help route requests to a user's current location, authenticate and authorize users for services, implement provider call-routing policies, and/or provide other features to users. SIP may also provide a registration function that allows users to upload their current locations for use by proxy servers.

Theft of service is the unauthorized interception and/or receipt of any communications service offered over a system without the consent of the system operator. For example, theft of service usually occurs if an individual(s) makes illegal physical connections to a system or alters (or installs) any unauthorized equipment so that the system signal can be received without the authorization or knowledge of a system operator. Theft of service currently threatens telephony services (e.g., Voice over Internet Protocol (VoIP) services) because it generates lost revenue for the system provider, and creates serious implications for the system provider in terms of legal liability, reputation, and/or user satisfaction.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and methods described herein may detect and prevent theft of service for SIP-based systems. For example, in one implementation, the systems and methods may provide identity assurance (e.g., identifying a user's identity before permitting access to resources) via password cracking and/or detecting spoofed traffic. In another implementation, the systems and methods may provide multiple end-points (e.g., SIP Uniform Resource Identifiers (URIs)) protection by blocking unauthorized registration attempts, enforcing a threshold on a number of calls generated from an individual user account, and/or enforcing a threshold on a number of registrations in a time period and from unusual (e.g., distant) geographical locations. In still another implementation, the systems and methods may provide intrusion detection by detecting anomalies in call usage patterns, optimizing filters to detect theft of service attacks, identifying unsolicited marketing attempts, and/or performing a location based analysis on incoming connections. In a further implementation, the systems and methods may test the theft of service mechanisms (e.g., identity assurance, multiple end-points protection, intrusion detection, etc.) under stressful conditions (e.g., a maximum traffic range in order to generate a performance breakdown of the theft of service mechanisms).

Figure 1:
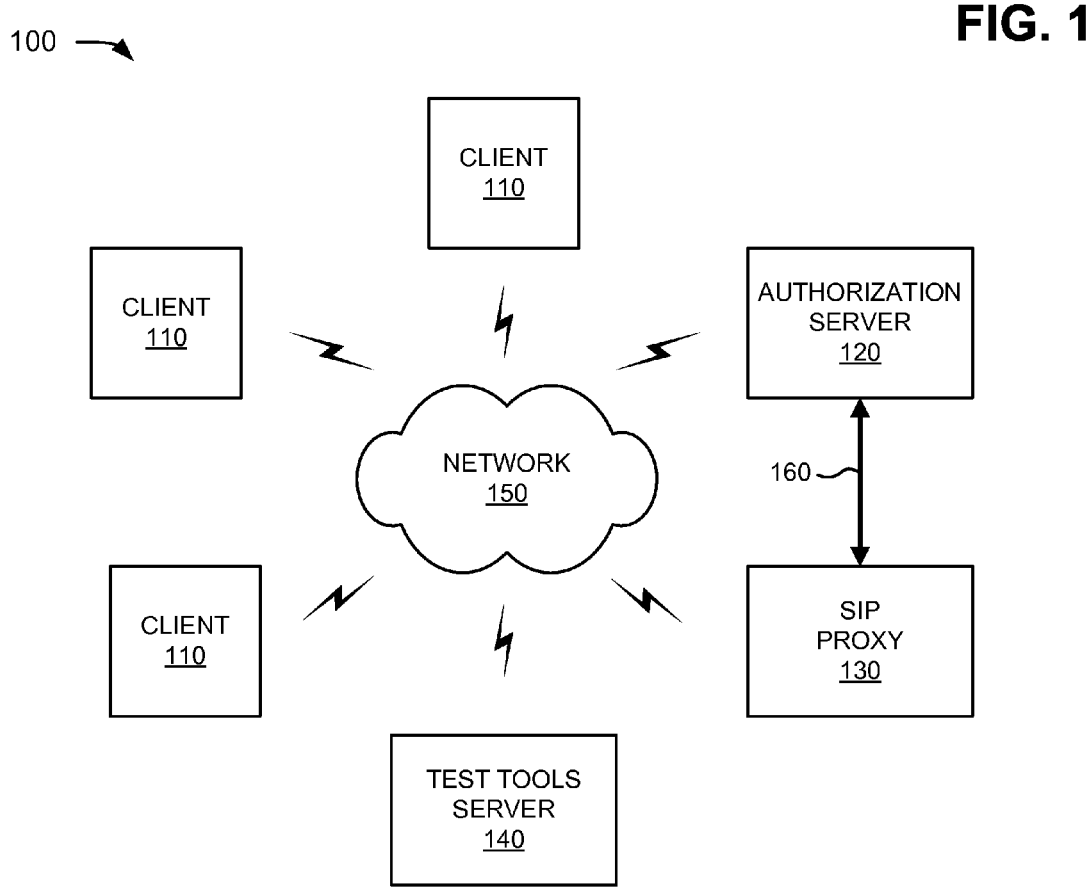
FIG. 1 depicts an exemplary network in which systems and methods described herein may be implemented.

FIG. 1 depicts an exemplary network 100 in which systems and methods described herein may be implemented. Network 100 may include multiple clients 110 connected to multiple servers (e.g., an authorization server 120, a SIP proxy 130, and/or a test tools server 140) via a network 150. Two clients 110 and three servers 120-140 have been illustrated as connected to network 150 for simplicity. In practice, there may be more or fewer clients and servers. Also, in some instances, a client may perform one or more functions of a server and/or a server may perform one or more functions of a client.

Clients 110 may include client entities. An entity may be defined as a device, such as a personal computer, a SIP telephone, a wireless telephone, a personal digital assistant (PDA), a lap top, a multimedia device, a soft phone, VoIP hardware, automated systems, or another type of computation or communication device, a thread or process running on one of these devices, and/or an object executable by one of these devices.

Authorization server 120 may include a server entity that gathers, processes, searches, and/or maintains applications (e.g., a high-speed, high-capacity packet processing applications). In one implementation, authorization server 120 may provide authorization services (e.g., billing information, account information, etc.) for SIP proxy 130.

SIP proxy 130 may include a device that facilitates the establishment of SIP calls, or a device that is capable of facilitating SIP-based communications, e.g., Internet-based telephone calls, multimedia distribution, multimedia conferences, instant messaging conferences, interactive voice response (IVR), automated and manual operator services, automatic call distribution, call routing, etc. As described in the Internet Engineering Task Force (IETF) document RFC 3261, SIP proxy 130 may act as both a server and a client for the purpose of making requests on behalf of other clients. Requests may be serviced internally or by passing them on, possibly after translation, to other servers (e.g., authorization server 120). SIP proxy 130 may interpret, and, if necessary, rewrite a request message before forwarding it.

Test tools server 140 may include a server entity that may be configured to permit, deny, and/or proxy data connections set and configured to prevent theft of service from SIP proxy 130. A basic task of test tools server 140 may be to control traffic between devices (e.g., clients 110, authorization server 120, and/or SIP proxy 130) of network 150. For example, test tools server 140 may provide a controlled interface between clients 110 and SIP proxy 130 through the enforcement of a security policy and connectivity model based on the least privilege principle and separation of duties. In one implementation, test tools server 140 may operate on data on behalf of an organizational network (e.g., a private network) and may prevent theft of service from SIP-based systems (e.g., SIP proxy 130) by untrusted sources (e.g., clients 110). For example, test tools server 140 may receive all, or substantially all, data destined for SIP proxy 130 and/or transmitted by SIP proxy 130.

Network 150 may include a local area network (LAN), a wide area network (WAN), a telephone network, such as the Public Switched Telephone Network (PSTN), an intranet, the Internet, a SIP-based network, a VoIP-based network, an IVR-based network, or a combination of networks. Clients 110, authorization server 120, and/or SIP proxy may connect to network 150 via wired and/or wireless connections.

As further shown in FIG. 1, authorization server 120 and SIP proxy 130 may exchange information via a security mechanism 150 (e.g., a DIAMETER protocol, an authentication, authorization and accounting protocol, etc.). In one implementation, security mechanism 150 may prevent eavesdropping, spoofing, and/or denial of service (DoS) from occurring in the information exchange between authorization server 120 and SIP proxy 130. In other implementations, security mechanism 150 may include a DIAMETER protocol using network level security (e.g., IP Security (IPSec)) or TLS. In still other implementations, test tools server 140 may provide testing of security mechanism 150 as described herein.

Although FIG. 1 shows authorization server 120 and SIP proxy 130 as separate entities, in other implementations, authorization server 120 and SIP proxy 130 may be configured as a single entity. In still other implementations, authorization server 120 may perform the functions of SIP proxy 130, or SIP proxy 130 may perform the functions of authorization server 120.

Although implementations are described below in the context of SIP and an Internet Protocol (IP)-based network, in other implementations equivalent or analogous communication protocols (e.g., International Telecommunication Union (ITU) H.323) and/or types of transport networks (e.g., asynchronous transfer mode (ATM), frame relay, etc.) may be used. Both the ITU H.323 standard and the IETF's SIP are examples of protocols that may be used for establishing a communications session among terminals (e.g., clients 110) connected to a network (e.g., network 150). Although SIP-type messages are shown for convenience, any type of protocol or a mixture of such protocols may be applied in various parts of the overall system.

Figure 2:
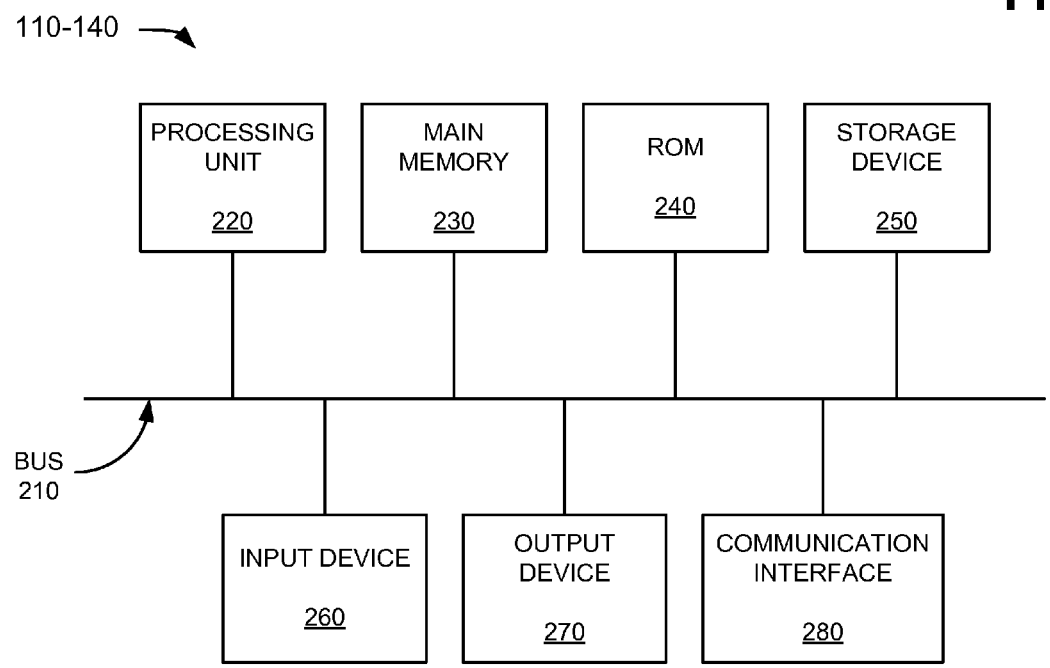
FIG. 2 depicts an exemplary device, client or server, configured to communicate via the exemplary network illustrated in FIG. 1.

FIG. 2 is an exemplary diagram of a client or server entity (hereinafter called "client/server entity"), which may correspond to one or more of clients 110, authorization server 120, SIP proxy 130, and/or test tools server 140. The client/server entity may include a bus 210, a processor 220, a main memory 230, a read only memory (ROM) 240, a storage device 250, an input device 260, an output device 270, and a communication interface 280. Bus 210 may include a path that permits communication among the elements of the client/server entity.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information into the client/server entity, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 150.

As will be described in detail below, the client/server entity may perform certain operations. The client/server entity may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of the client/server entity, in other implementations, the client/server entity may contain fewer, different, or additional components than depicted in FIG. 2. In still other implementations, one or more components of the client/server entity may perform one or more of the tasks performed by one or more other components of the client/server entity.

Compared to the PSTN, VoIP may be more susceptible to theft of service attacks since connections may be virtually performed. Theft of service may be narrowed down to various challenging tasks, such as portability, emergency dialing, voicemail access, etc. However, theft of service may present three challenging tasks (i.e., identity assurance, multiple endpoints, and/or intrusion detection) that may be addressed by the systems and methods described herein.

Identity assurance may involve use of a mechanism to identify a user before permitting the user access to resources (e.g., SIP proxy 130) and without affecting overall system performance. One challenge may include carrying out identity assurance without excessively affecting overall system performance.

With regard to multiple end-points, SIP may allow subscribers to have a single address of record (AOR) with multiple SIP URIs. The challenge may include allowing users to have a single AOR with multiple SIP URIs, while still being able to detect an adversary on one of the URIs trying to abuse resources. This complex problem may not be cured with certificate-based authentication because an authorized user may be deliberately sharing their secret information to permit unauthorized users to make calls for profit. Another challenge may include making the solution effective to reduce false negatives (e.g., a high fraud detection rate), but not so effective that it prevents legitimate users from being classified as false positives.

Intrusion detection may include detecting and/or logging malicious and/or suspicious intents that may not be detected by static filters (e.g., firewalls). Intrusion detection may be used in complementary ways to establish identity assurance in order to prevent identity assurance-based theft of service attacks.

Figure 3:
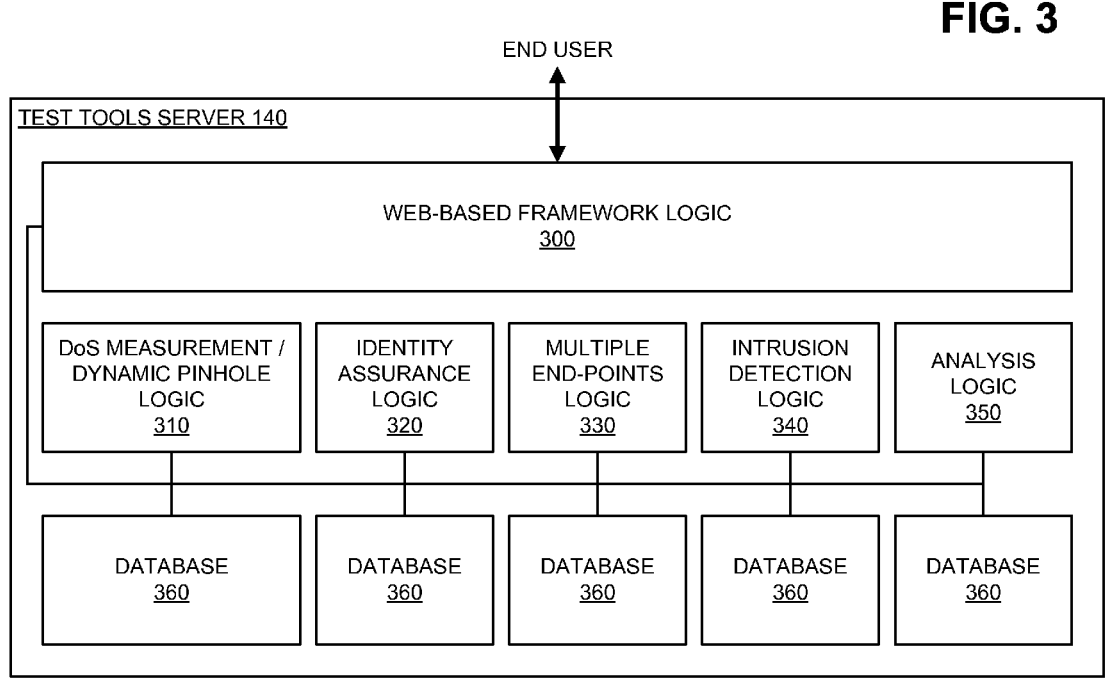
FIG. 3 is an exemplary diagram of a test tools server of the network depicted in FIG. 1.

FIG. 3 is an exemplary diagram of test tools server 140. Test tools server 140 may provide theft of service architectural integrity validation tools for SIP-based systems (e.g., SIP proxy 130), and/or may address the challenges presented by identity assurance, multiple end-points, and/or intrusion detection. As illustrated, test tools server 140 may include a variety of components, such as web-based framework logic 300, denial of service (DoS) measurement and/or dynamic pinhole logic 310, identity assurance logic 320, multiple end-points logic 330, intrusion detection logic 340, analysis logic 350, and/or one or more databases 360.

Web-based framework logic 300 may include any hardware and/or software based logic that may provide a bridge between an end user (e.g., client 110) and the components of test tools server 140. For example, in one implementation, web-based framework logic 300 may be developed via software (e.g., in the Perl language), and/or may provide a lightweight inbuilt web server for high performance. In other implementations, web-based framework logic 300 may automate navigation through the components of test tools server 140, as well as public-domain software and/or home-grown test tools. In still other implementations, web-based framework logic 300 may provide a web-based graphical user interface that may be used to launch high performance traffic tests on a SIP-based system for verification of pinholes (i.e., ports that may be opened through a firewall to allow a particular application to gain controlled access to a resource), SIP DoS, and/or theft of service.

DoS measurement/dynamic pinhole logic 310 may include any hardware and/or software based logic that may provide SIP-based DoS validation and/or verification of pinholes and SIP-based DoS. In one implementation, DoS measurement/dynamic pinhole logic 310 may include the features set forth in co-pending application Ser. No. 11/557,751, filed Nov. 8, 2006, entitled "SYSTEMS AND METHOD FOR TESTING NETWORK FIREWALL FINE GRANULARITY SYSTEMS," the disclosure of which is incorporated by reference herein in its entirety. In another implementation, DoS measurement/dynamic pinhole logic 310 may include the features set forth in co-pending application Ser. No. 11/557,703, filed Nov. 8, 2006, entitled "SYSTEMS AND METHODS FOR IMPLEMENTING A PROTOCOL-AWARE NETWORK FIREWALL," the disclosure of which is incorporated by reference herein in its entirety. In still another implementation, DoS measurement/dynamic pinhole logic 310 may include the features set forth in co-pending application Ser. No. 11/557,740, filed Nov. 8, 2006, entitled "PREVENTION OF DENIAL OF SERVICE (DoS) ATTACKS ON SESSION INITIATION PROTOCOL (SIP)-BASED SYSTEMS USING RETURN ROUTABILITY CHECK FILTERING," the disclosure of which is incorporated by reference herein in its entirety. In a further implementation, DoS measurement/dynamic pinhole logic 310 may include the features set forth in co-pending application Ser. No. 11/557,739, filed Nov. 8, 2006, entitled "PREVENTION OF DENIAL OF SERVICE (DoS) ATTACKS ON SESSION INITIATION PROTOCOL (SIP)-BASED SYSTEMS USING METHOD VULNERABILITY FILTERING," the disclosure of which is incorporated by reference herein in its entirety. In still a further implementation, DoS measurement/dynamic pinhole logic 310 may include the features set forth in co-pending application Ser. No. 11/771,502, filed Jun. 29, 2007, entitled "SYSTEM AND METHOD FOR TESTING NETWORK FIREWALL FOR DENIAL-OF-SERVICE (DOS) DETECTION AND PREVENTION IN SIGNALING CHANNEL," the disclosure of which is incorporated by reference herein in its entirety.

Identity assurance logic 320 may include any hardware and/or software based logic that identifies a user's identity before permitting the user access to resources (e.g., SIP proxy 130) via password cracking (e.g., verification or checking) and/or detecting spoofed traffic. For example, in one implementation, identity assurance logic 320 may determine supported protocols for SIP proxy 130, and/or may verify support for different identity assurance mechanisms (e.g., digest authentication, transport layer security (TLS), secure/multi-purpose Internet mail extensions (S/MIME), as described below).

In one example, identity assurance logic 320 may include and/or support a digest authentication mechanism that may provide a basic level of authentication challenge between a SIP proxy server (e.g., SIP proxy 130) and a SIP user agent (e.g., client 110). A digest authentication mechanism may eliminate spoofing of messages and may maintain the integrity of a system (e.g., SIP proxy 130).

In another example, identity assurance logic 320 may include and/or support a TLS mechanism that may prevent eavesdropping, tampering, and/or message forgery of SIP session communications. Running SIP over a TLS mechanism may provide secure connections on a hop-by-hop basis by authenticating (e.g., via a certificate) a server (e.g., SIP proxy 130), while a SIP user agent (e.g., client 110) may be unauthenticated. In one implementation, the TLS mechanism may be implemented if the SIP server (e.g., SIP proxy 130) supports transmission control protocol (TCP).

In still another example, identity assurance logic 320 may include and/or support a S/MIME mechanism that may encrypt data directly within SIP messages and may prevent proxy servers (e.g., SIP proxy 130) from retaining information about SIP messages. A S/MIME mechanism may include a public-key infrastructure, and may provide end-to-end encryption.

Multiple end-points logic 330 may include any hardware and/or software based logic that may provide multiple end-points (e.g., SIP URIs (e.g., clients 110), authorization server 120, and/or SIP proxy 130) protection by blocking unauthorized registration attempts, enforcing a threshold on a number of calls generated from an individual user account, and/or enforcing a threshold on a number of registrations in a time period. Multiple end-points logic 330 may include and/or support a variety of mechanisms to identify and/or protect multiple end-points.

In one example, multiple end-points logic 330 may include and/or support an IP address mechanism that detects a sudden change in IP address. Although SIP users may be encouraged to access VoIP services without geographical boundaries, a sudden change in IP address (e.g., from New York to Hong Kong), within a short time period (e.g., a few minutes), may direct multiple end-points logic 330 to carefully monitor further transactions. In one implementation, multiple end-points logic 330 may use a subscription service (e.g., "maxmind.com" subscription) to determine a geographical location of an IP address.

In another example, multiple end-points logic 330 may include and/or support a certificate-based authentication mechanism that provides an effective way to distinguish authorized users from unauthorized users. In one implementation, the certificate-based authentication mechanism may distribute an independent certificate to each authorized user (e.g., to each authorized client 110).

In still another example, multiple end-points logic 330 may include and/or support a statistical usage model that may detect theft of service based on network (e.g., network 150) and/or individual (e.g., client 110) usage. The statistical usage model may collect cumulative statistics from the network, and may create usage patterns to compare against collected individual usage. Depending on the deviation from the pattern(s), the statistical usage model may slow down a call session, may make services temporarily unavailable, and/or may completely block a user until manual inspection of the user is attained.

In a further example, multiple end-points logic 330 may include and/or support a statistical geographical model that may detect theft of service based on geographical location of a network (e.g., network 150). The statistical geographical model may detect an abnormal usage pattern based on whether physically distant and diverse IP networks are used in a short period of time. The statistical geographical model may perform an analysis based on distance between networks and/or the time period, and may establish distance and time thresholds based on real data and optimized to reduce false negatives and/or false positives. For example, a user logging into networks from physically distant locations (e.g., Hungary and Mexico) within a short time period (e.g., minutes) may cause the statistical model to trigger preventative measures.

In still a further example, multiple end-points logic 330 may include and/or support a statistical model that receives information from other mechanisms to identify multiple end-points. For example, the statistical model may receive device type information from devices, such as a multimedia device, a soft phone, VoIP hardware, automated calling systems, etc. The device type information may be used to augment the end-point distance and time information calculated by the statistical geographical model, and/or to trigger a decision. For example, if the distance and time information indicates that fraud is occurring and that a device used is an automated calling system, this information may cause an upgrade in fraud threat estimation.

Intrusion detection logic 340 may include any hardware and/or software based logic that may provide intrusion detection by detecting anomalies in call usage patterns, optimizing filters to detect theft of service attacks, identifying unsolicited marketing attempts, and/or performing a location based analysis on incoming connections. In one implementation, intrusion detection logic 340 may prevent theft of service attacks (e.g., hijacking end-points) that may circumvent the digest authentication mechanism, the TLS mechanism, and/or the S/MIME mechanism provided by identity assurance logic 320. Intrusion detection logic 340 may include and/or support a variety of mechanisms to detect intrusions.

In one example, intrusion detection logic 340 may include and/or support an intrusion detection system that includes a sensor to receive security events, a console to monitor the security events, and/or a device to record security events received by the sensor over time. In one implementation, using open-source software (e.g., SNORT), the intrusion detection system may include a network-based intrusion detection and prevention system that detects behavior-based anomalies and/or knowledge-based anomalies. The intrusion detection system may detect behavior-based anomalies using a statistical approach (e.g., by using historical data to create patterns). The intrusion detection system may detect knowledge-based anomalies by capturing packets and decoding the packets for analysis with signatures of known attacks.

In another example, intrusion detection logic 340 may include and/or support SIP syntactic and/or state analysis that may be executed during dropping or accepting of a packet. The SIP syntactic and/or state analysis may detect if requests are following patterns defined in standards. For example, in one implementation, the SIP syntactic and/or state analysis may include rules to handle out-of-domain SIP requests. If a SIP request does not have an address in a home domain, and SIP proxy 130 is an outbound server, then intrusion detection logic 340 may route the request. However, if SIP proxy 130 is not an outbound server and still routes the SIP request, then intrusion detection logic 340 may need to stop the request to avoid theft of service attacks (e.g., a SIP request for "website.com" to a server with a home domain of "school.edu" may not be routed unless the "school.edu" server is an outbound server). In another implementation, the SIP syntactic and/or state analysis may include rules to handle suspicious BYE and INVITE SIP commands. If a server (e.g., SIP proxy 130) receives an INVITE or BYE from different IP addresses, intrusion detection logic 340 may generate an alert and may take corrective measures. A spoofed re-INVITE command may modify security attributes of a session using Session Description Protocol (SDP) and may lay the groundwork for theft of service. Intrusion detection logic 340 may take corrective measures against such spoofed re-INVITE commands.

Analysis logic 350 may include any hardware and/or software based logic that may provide validation tools (e.g., a digest authentication mechanism, a TLS mechanism, a S/MIME mechanism, a user datagram protocol (UDP) mechanism, and/or an IPSec mechanism) and/or detection tools (e.g., a mechanism to detect behavior-based attacks and/or a mechanism to detect knowledge-based attacks).

Database(s) 360 may include one or more databases provided in a memory device of test tools server 140 (e.g., within main memory 230, ROM 240, and/or storage device 250). Database(s) 360 may include information associated with DoS measurement/dynamic pinhole logic 310, identity assurance logic 320, multiple end-points logic 330, and/or intrusion detection logic 340. For example, database(s) 360 may include rules, thresholds, analyses, collected data, patterns, etc. associated with logic 310-340, as described above.

Although FIG. 3 shows exemplary components of test tools server 140, in other implementations, test tools server 140 may contain fewer, different, or additional components than depicted in FIG. 3. In still other implementations, one or more components of test tools server 140 may perform one or more of the tasks described as being performed by one or more other components of test tools server 140.

Figure 4:
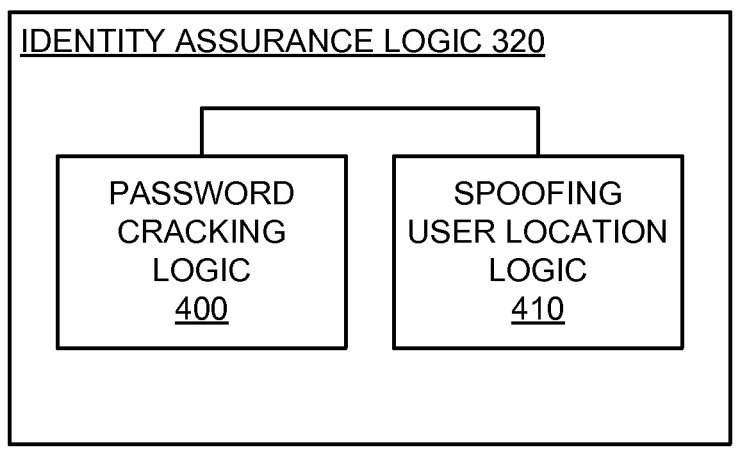
FIG. 4 is an exemplary diagram of identity assurance logic of the test tools server illustrated in FIG. 3.

FIG. 4 is an exemplary functional block diagram of identity assurance logic 320 of test tools server 140. As illustrated, identity assurance logic 320 may include a variety of components, such as password cracking logic 400 and/or spoofing user location logic 410.

Password cracking logic 400 may include any hardware and/or software based logic that may determine supported protocols and/or may verify support for different identity assurance mechanisms (e.g., a digest authentication mechanism, a TLS mechanism, and/or a S/MIME mechanism). Password cracking logic 400 may provide password guessing by launching a dictionary attack, and may prevent users (e.g., clients 110) from using weak passwords in the digest authentication mechanism. Password cracking logic 400 may calculate a new computation using a server-generated (e.g., via test tools server 140) nonce for each password cracking attempt. In the process of cracking a password, password cracking logic 400 may generate a registration request in response to a proxy (e.g., SIP proxy 130) authentication challenge (e.g., "407" or "401"). If the proxy (e.g., SIP proxy 130) returns a "200 OK" response, password cracking logic 400 may determine that the password has been successfully cracked. However, if the proxy returns a "407" or a "401" responses, password cracking logic 400 may determine that authentication failed and that another unused password may be attempted. If a password list (e.g., within database(s) 360) is exhausted before the password is cracked, password cracking logic 400 may determine the password to be secure.

Spoofing user location logic 410 may include any hardware and/or software based logic that may detect spoofed traffic (e.g., from clients 110), and may completely block the spoofed traffic. Spoofing user location logic 410 may eliminate spoofing of messages and may maintain the integrity of a system (e.g., SIP proxy 130). Spoofing user location logic 410 may drop unauthenticated SIP INVITE messages, and/or may identify a minimum cryptographic strength for TLS.

Although FIG. 4 shows exemplary components of identity assurance logic 320, in other implementations, identity assurance logic 320 may contain fewer, different, or additional components than depicted in FIG. 4. In still other implementations, one or more components of identity assurance logic 320 may perform one or more of the tasks described as being performed by one or more other components of identity assurance logic 320.

Figure 5:
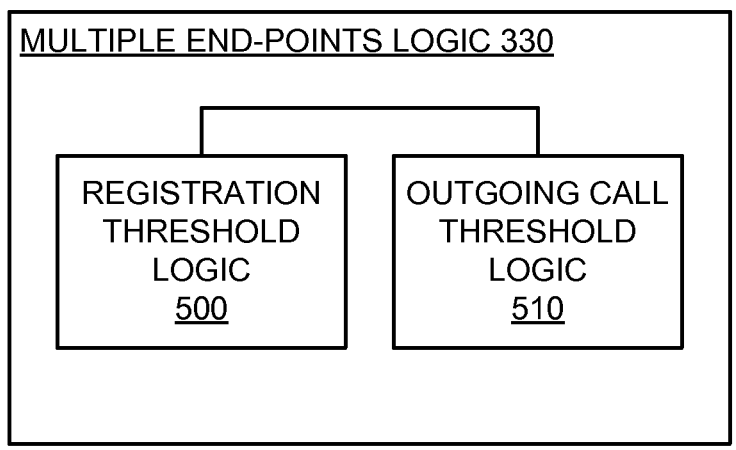
FIG. 5 is an exemplary diagram of multiple end-points logic of the test tools server depicted in FIG. 3.

FIG. 5 is an exemplary functional block diagram of multiple end-points logic 330 of test tools server 140. As illustrated, multiple end-points logic 330 may include a variety of components, such as registration threshold logic 500 and/or outgoing call threshold logic 510.

Registration threshold logic 500 may include any hardware and/or software based logic that may distinguish between an audio call, a single media stream, or multiple destination signaling, and/or may enforce a threshold on a number of registrations that may be performed in a time frame from a user account (e.g., client 110). If the number of registrations exceeds the threshold value, registration threshold logic 500 may request that the user account be manually inspected, and/or may block unauthorized registration attempts (e.g., from the user account).

Outgoing call threshold logic 510 may include any hardware and/or software based logic that may distinguish between an audio call, a single media stream, or multiple destination signaling, and/or may verify if a SIP proxy (e.g., SIP proxy 130) permits a user to launch multiple simultaneous calls. For example, outgoing call threshold logic 510 may configure clients 110 on network 150 to initiate calls from a single user account, and may determine if making simultaneous calls is possible. Outgoing call threshold logic 510 may enforce a threshold on a number of calls that may be generated from a single user account (e.g., client 110). The threshold value may be variable, and may be calculated by outgoing call threshold logic 510 from usage history (e.g., provided in database(s) 360).

Although FIG. 5 shows exemplary components of multiple end-points logic 330, in other implementations, multiple end-points logic 330 may contain fewer, different, or additional components than depicted in FIG. 5. In still other implementations, one or more components of multiple end-points logic 330 may perform one or more of the tasks described as being performed by one or more other components of multiple end-points logic 330.

Figure 6:
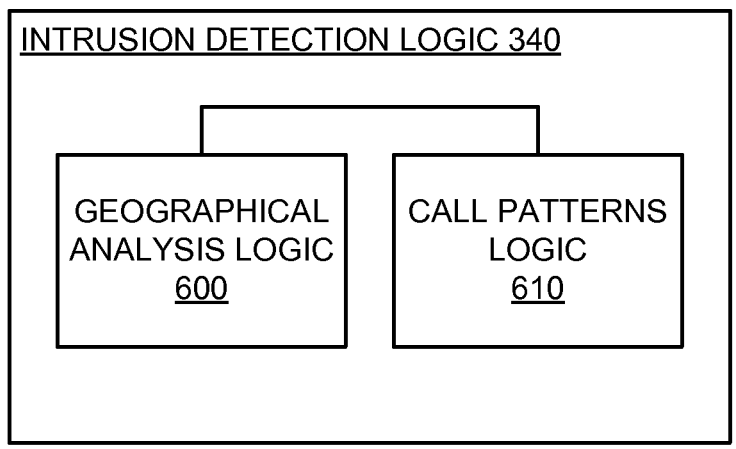
FIG. 6 is an exemplary diagram of intrusion detection logic of the test tools server illustrated in FIG. 3.

FIG. 6 is an exemplary functional block diagram of intrusion detection logic 340 of test tools server 140. As illustrated, intrusion detection logic 340 may include a variety of components, such as geographical analysis logic 600 and/or call patterns logic 610.

Geographical analysis logic 600 may include any hardware and/or software based logic that may parse message logs (e.g., provided in database(s) 360) to identify if a particular call source is an unsolicited marketing attempt. Geographical analysis logic 600 may accomplish this by calculating inbound frequencies from different user accounts (e.g., clients 110). Geographical analysis logic 600 may extract IP addresses from the message logs to create a geographical profile, and/or may perform a location-based analysis on different incoming connections.

Call patterns logic 610 may include any hardware and/or software based logic that may detect an anomaly in a usage pattern, and/or may perform a statistical analysis on usage history (e.g., provided in database(s) 360). Call patterns logic 610 may identify and/or optimize (e.g., via SNORT) filters to detect different types of theft of service attacks on SIP, SDP (e.g., a protocol used to manage and/or alter services during active call sessions), and/or DIAMETER (e.g., a protocol providing authentication, authorization, and/or accounting). Call patterns logic 610 may counter flood-causing method vulnerabilities (e.g., an out-of-state INVITE, a re-INVITE, a CANCEL, and/or a BYE) using behavioral-based and/or knowledge-based techniques. In the event of an anomaly, call patterns logic 610 may provide a signal to a security event management system.

Although FIG. 6 shows exemplary components of intrusion detection logic 340, in other implementations, intrusion detection logic 340 may contain fewer, different, or additional components than depicted in FIG. 6. In still other implementations, one or more components of intrusion detection logic 340 may perform one or more of the tasks described as being performed by one or more other components of intrusion detection logic 340.

Figure 7:
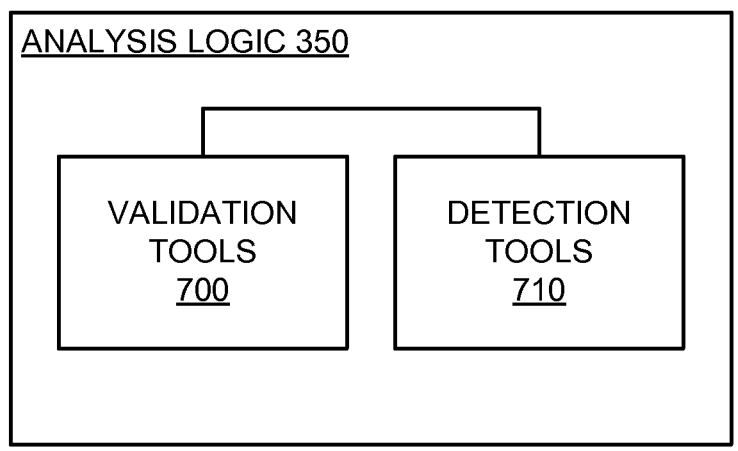
FIG. 7 is an exemplary diagram of analysis logic of the test tools server depicted in FIG. 3.

FIG. 7 is an exemplary functional block diagram of analysis logic 350 of test tools server 140. As illustrated, analysis logic 350 may include a variety of components, such as validation tools 700 and/or detection tools 710.

Validation tools 700 may include any hardware and/or software based logic that may provide validation mechanisms to prevent theft of service. For example, validation tools 710 may include a digest authentication mechanism, a TLS mechanism (e.g., via TCP/IP), a S/MIME mechanism, a UDP mechanism, and/or an IPSec mechanism.

Detection tools 710 may include any hardware and/or software based logic that may provide detection mechanisms to prevent theft of service. For example, detection tools 710 may include a mechanism to detect behavior-based attacks (e.g., to detect behavior-based anomalies using a statistical approach), and/or a mechanism to detect knowledge-based attacks (e.g., to detect knowledge-based anomalies by capturing packets and decoding the packets for analysis with signatures of known attacks).

Although FIG. 7 shows exemplary components of analysis logic 350, in other implementations, analysis logic 350 may contain fewer, different, or additional components than depicted in FIG. 7. In still other implementations, one or more components of analysis logic 350 may perform one or more of the tasks described as being performed by one or more other components of analysis logic 350.

Figure 8:
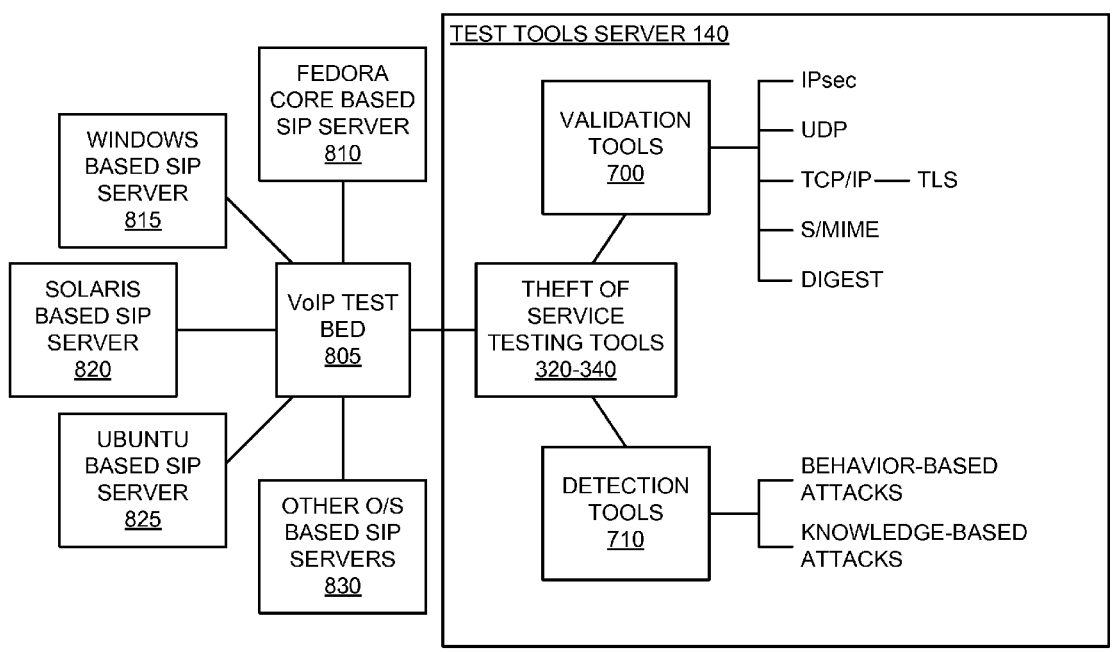
FIG. 8 depicts an exemplary system for testing the test tools server illustrated in FIG. 3.

FIG. 8 depicts an exemplary system 800 for testing test tools server 140. System 800 may test the theft of service mechanisms (e.g., identity assurance logic 320, multiple end-points logic 330, and/or intrusion detection logic 340) and analysis logic 350 (e.g., validation tools 700 and/or detection tools 710) of test tools server 140 under stressful conditions (e.g., a maximum traffic range in order to generate a performance breakdown of the theft of service mechanisms). System 800 may provide test environment data (e.g., computer-generated traffic) to test tools server 140 in order to validate the functionality of test tools server 140 in a controlled environment. System 800 may provide real environment data (e.g., call logs from SIP proxy 130 operating in a carrier class environment) to test tools server 140 in order to train test tools server 140 with real data. System 800 may compare the results of the test environment data and the results of the real environment data in order to determine a measure of a detection performance of test tools server 140. System 800 may thus validate test tools server 140 against various security practices and/or policies.

As illustrated in FIG. 8, system 800 may include test tools server 140 and its corresponding components (e.g., theft of service testing tools 320-340, validation tools 700, and/or detection tools 710), as described above in connection with FIGS. 3-7. System 800 may further include a VoIP test bed 805, a Fedora core based SIP server 810, a Windows based SIP server 815, a Solaris based SIP server 820, an Ubuntu based SIP server 825, and/or other operating system (O/S) based SIP servers 830.

VoIP test bed 805 may include generic SIP components (e.g., a SIP telephone, a multimedia device, a soft phone, VoIP hardware, automated systems, etc.), and/or open-source tools to effectively validate testing tools provided by test tools server 140.

SIP servers 810-830 may include a distributed and scalable architecture of a variety of SIP-based servers interlinked together to represent a real SIP setup. In one implementation, each of SIP servers 810-830 may include a different operating system. For example, Fedora core based SIP server 810 may include a Fedora core-based operating system, Windows based SIP server 810 may include a Windows-based operating system, Solaris based SIP server 820 may include a Solaris-based operating system, Ubuntu based SIP server 825 may include an Ubuntu-based operating system, and/or other O/S based SIP server 830 may include any other operating system compatible with SIP-based servers.

Although FIG. 8 shows exemplary components of system 800, in other implementations, system 800 may contain fewer, different, or additional components than depicted in FIG. 8. In still other implementations, one or more components of system 800 may perform one or more of the tasks described as being performed by one or more other components of system 800.

Figure 9:
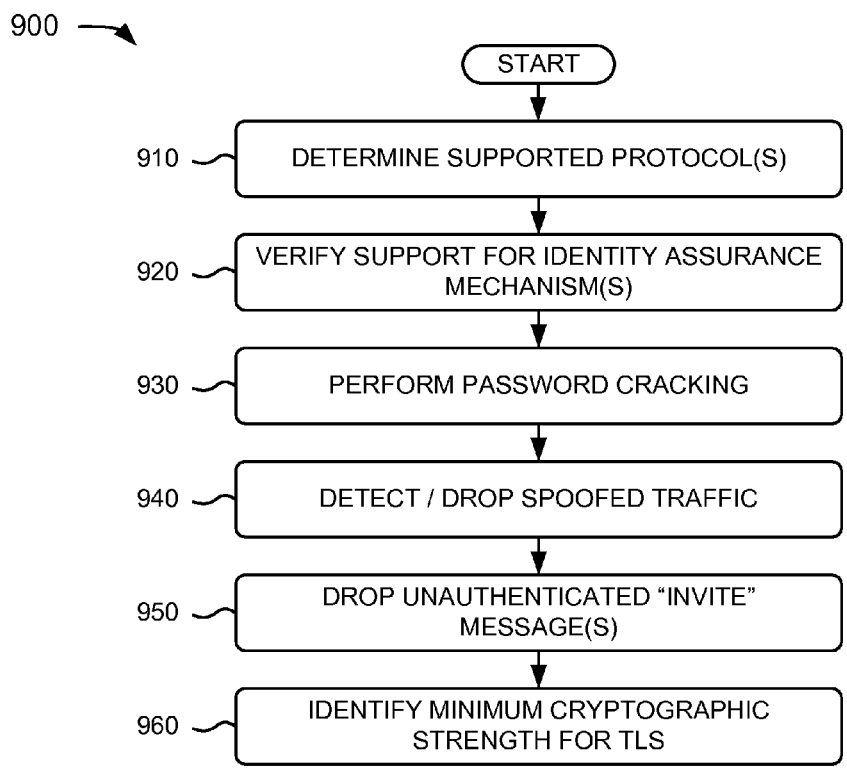
FIGS. 9-12 are flowcharts of exemplary processes according to implementations described herein.

FIGS. 9-12 are flowcharts of exemplary processes capable of being performed by authorization server 120, SIP proxy 130, test tools server 140, and/or combinations of the aforementioned devices. As shown in FIG. 9, a process 900 for protecting against identity assurance attacks may begin with determining one or more supported protocols (block 910), and/or verifying support for one or more identity assurance mechanisms (block 920). For example, in one implementation described above in connection with FIG. 4, identity assurance logic 320 of test tools server 140 may include password cracking logic 400 that may determine supported protocols and/or may verify support for different identity assurance mechanisms (e.g., a digest authentication mechanism, a TLS mechanism, and/or a S/MIME mechanism).

As further shown in FIG. 9, password cracking may be performed (block 930). For example, in one implementation described above in connection with FIG. 4, password cracking logic 400 may generate a registration request in response to a proxy (e.g., SIP proxy 130) authentication challenge (e.g., "407" or "401"). If the proxy (e.g., SIP proxy 130) returns a "200 OK" response, password cracking logic 400 may determine that the password has been successfully cracked. However, if the proxy returns a "407" or a "401" response, password cracking logic 400 may determine that authentication failed and that another unused password may be attempted. If a password list (e.g., within database(s) 360) is exhausted before the password is cracked, password cracking logic 400 may determine the password to be secure.

Returning to FIG. 9, spoofed traffic may be detected and/or dropped (block 940), unauthenticated INVITE messages may be dropped (block 950), and/or minimum cryptographic strength may be determined for TLS (block 960). For example, in one implementation described above in connection with FIG. 4, identity assurance logic 320 of test tools server 140 may include spoofing user location logic 410 that may detect spoofed traffic (e.g., from clients 110), and may completely block the spoofed traffic. Spoofing user location logic 410 may eliminate spoofing of messages and may maintain the integrity of a system (e.g., SIP proxy 130). Spoofing user location logic 410 may drop unauthenticated SIP INVITE messages, and/or may identify a minimum cryptographic strength for TLS.

Figure 10:
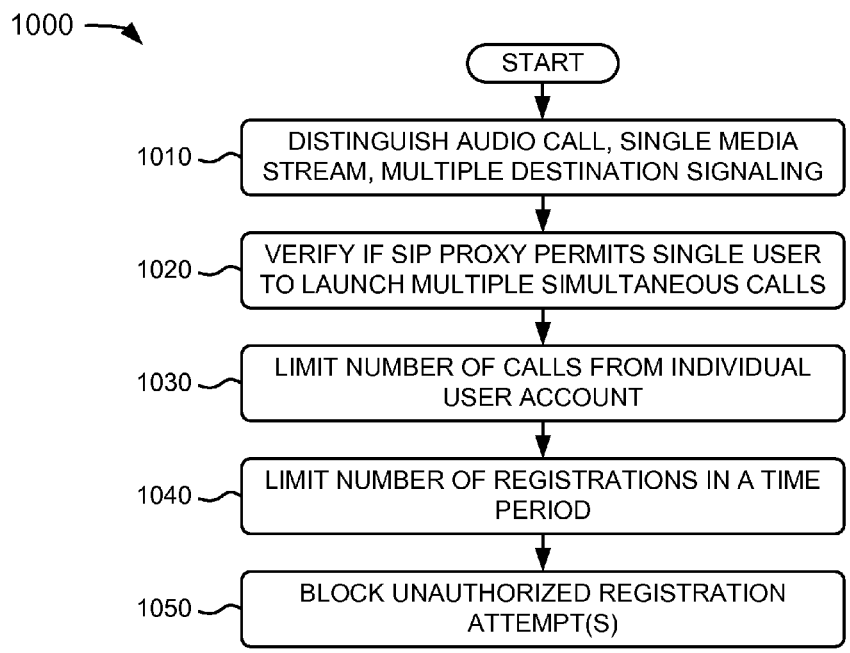

As shown in FIG. 10, a process 1000 for protecting against multiple end-points attacks may begin with distinguishing an audio call, a single media stream, and/or multiple destination signaling (block 1010), and/or verifying if a SIP proxy permits a single user to launch multiple simultaneous calls (block 1020). For example, in one implementation described above in connection with FIG. 5, multiple end-points logic 330 of test tools server 140 may include registration threshold logic 500 and outgoing call threshold logic 510 that that may distinguish between an audio call, a single media stream, or multiple destination signaling. Outgoing call threshold logic 510 may verify if a SIP proxy (e.g., SIP proxy 130) permits a user to launch multiple simultaneous calls. For example, outgoing call threshold logic 510 may configure clients 110 on network 150 to initiate calls from a single user account, and may determine if making simultaneous calls is possible.

As further shown in FIG. 10, a number of calls from an individual user account may be limited (block 1030). For example, in one implementation described above in connection with FIG. 5, outgoing call threshold logic 510 may enforce a threshold on a number of calls that may be generated from a single user account (e.g., client 110). The threshold value may be variable, and may be calculated by outgoing call threshold logic 510 from usage history (e.g., provided in database(s) 360).

Returning to FIG. 10, a number of registrations in a time period may be limited (block 1040), and/or unauthorized registration attempts may be blocked (block 1050). For example, in one implementation described above in connection with FIG. 5, registration threshold logic 500 may enforce a threshold on a number of registrations that may be performed in a time frame from a user account (e.g., client 110). If the number of registrations exceeds the threshold value, registration threshold logic 500 may request that the user account be manually inspected, and/or may block unauthorized registration attempts (e.g., from the user account).

Figure 11:
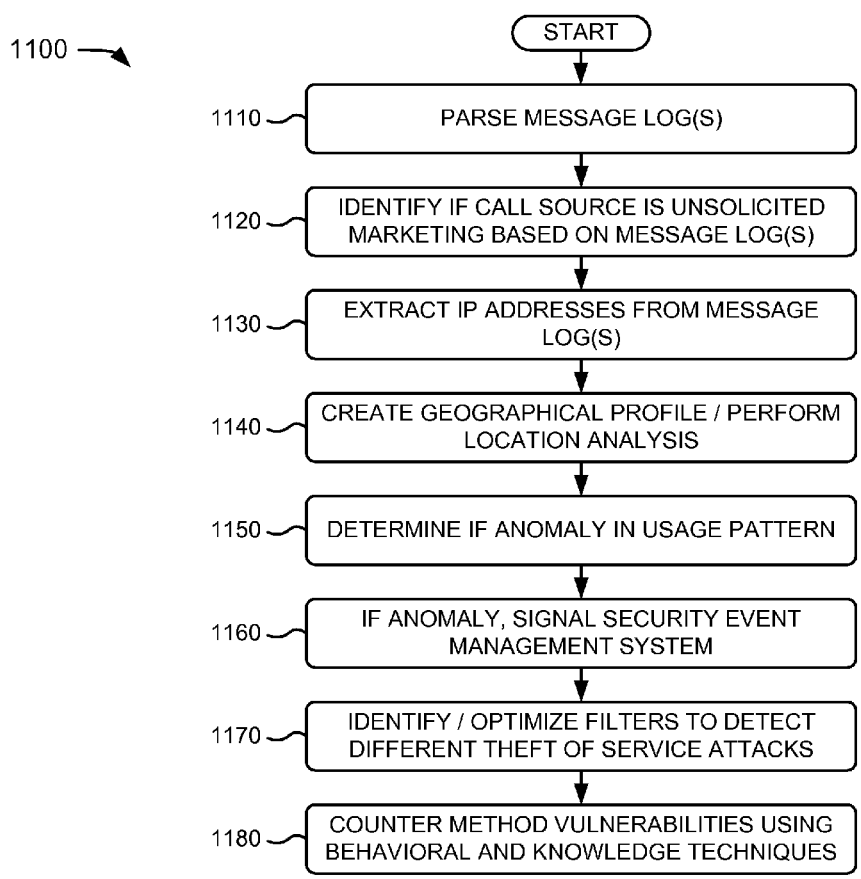

As shown in FIG. 11, a process 1100 for protecting against intrusion detection attacks may begin with parsing one or more message logs (block 1110), and/or identifying if a call source is unsolicited marketing based on the one or more message logs (block 1120). For example, in one implementation described above in connection with FIG. 6, intrusion detection logic 340 of test tools server 140 may include geographical analysis logic 600 that may parse message logs (e.g., provided in database(s) 360) to identify if a particular call source is an unsolicited marketing attempt. Geographical analysis logic 600 may accomplish this by calculating inbound frequencies from different user accounts (e.g., clients 110).

As further shown in FIG. 11, IP addresses from the one or more message logs may be extracted (block 1130), and/or a geographical profile may be created and a location analysis may be performed (block 1140). For example, in one implementation described above in connection with FIG. 6, geographical analysis logic 600 may extract IP addresses from the message logs to create a geographical profile, and/or may perform a location-based analysis on different incoming connections.

Returning to FIG. 11, it may be determined if an anomaly exists in a usage pattern (block 1150), and/or if an anomaly exists, a security event management system may be signaled (block 1160). For example, in one implementation described above in connection with FIG. 6, intrusion detection logic 340 of test tools server 140 may include call patterns logic 610 that may detect an anomaly in a usage pattern, and/or may perform a statistical analysis on usage history (e.g., provided in database(s) 360 and/or other available databases depending on the accuracy required). In the event of an anomaly, call patterns logic 610 may provide a signal or an alert to a security event management system.

As further shown in FIG. 11, filters to detect different theft of service attacks may be identified and/or optimized (block 1170), and/or method vulnerabilities may be countered using behavioral and knowledge techniques (block 1180). For example, in one implementation described above in connection with FIG. 6, call patterns logic 610 may identify and/or optimize (e.g., via SNORT) filters to detect different types of theft of service attacks on SIP, SDP (e.g., a protocol used to manage and/or alter services during active call sessions), and/or DIAMETER (e.g., a protocol providing authentication, authorization, and/or accounting). Call patterns logic 610 may counter flood-causing method vulnerabilities (e.g., an out-of-state INVITE, a re-INVITE, a CANCEL, and/or a BYE) using behavioral-based and/or knowledge-based techniques.

Figure 12:
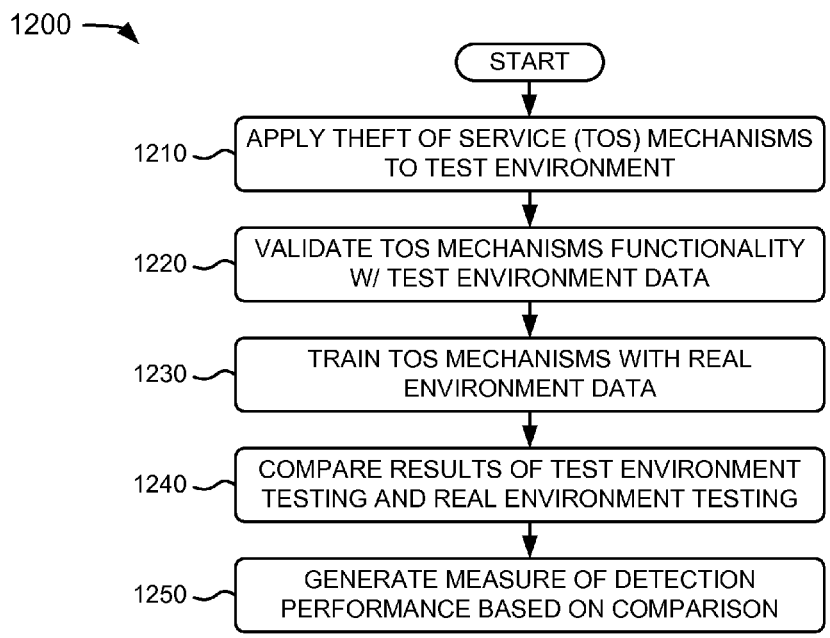

As shown in FIG. 12, a process 1200 for testing theft of service (TOS) mechanisms may begin with applying the theft of service mechanisms to a test environment (block 1210), and/or validating the theft of service mechanisms functionality with test environment data (block 1220). For example, in one implementation described above in connection with FIG. 8, system 800 may include a test environment (e.g., VoIP test bed 805 and/or SIP servers 810-830) that tests the theft of service mechanisms (e.g., identity assurance logic 320, multiple end-points logic 330, and/or intrusion detection logic 340) and analysis logic 350 (e.g., validation tools 700 and/or detection tools 710) of test tools server 140 under stressful conditions (e.g., a maximum traffic range in order to generate a performance breakdown of the theft of service mechanisms). System 800 may provide test environment data (e.g., computer-generated traffic) to test tools server 140 in order to validate the functionality of test tools server 140 in a controlled environment.

As further shown in FIG. 12, the theft of service mechanisms may be trained with real environment data (block 1230). For example, in one implementation described above in connection with FIG. 8, system 800 may provide real environment data (e.g., call logs from SIP proxy 130 operating in a carrier class environment) to test tools server 140 in order to train test tools server 140 with real data.

Returning to FIG. 12, the results of the test environment testing and the real environment testing may be compared (block 1240), and/or a measure of detection performance may be generated based on the comparison (block 1250). For example, in one implementation described above in connection with FIG. 8, system 800 may compare the results of the test environment data and the results of the real environment data in order to determine a measure of a detection performance of test tools server 140. System 800 may thus validate test tools server 140 against various security practices and/or policies.

Systems and methods described herein may detect and prevent theft of service for SIP-based systems. For example, in one implementation, the systems and methods may provide identity assurance via password cracking and/or detecting spoofed traffic. In another implementation, the systems and methods may provide multiple end-points protection by blocking unauthorized registration attempts, enforcing a threshold on a number of calls generated from an individual user account, and/or enforcing a threshold on a number of registrations in a time period. In still another implementation, the systems and methods may provide intrusion detection by detecting anomalies in call usage patterns, optimizing filters to detect theft of service attacks, identifying unsolicited marketing attempts, and/or performing a location based analysis on incoming connections. In a further implementation, the systems and methods may test the theft of service mechanisms under stressful conditions.

The foregoing description provides illustration and description, but is not intended to be exhaustive or to limit the embodiments to the precise form disclosed. Modifications and variations are possible in light of the above teachings or may be acquired from practice of the invention.

For example, while series of acts have been described with regard to the flowcharts of FIGS. 9-12, the order of the acts may differ in other implementations. Further, non-dependent acts may be performed in parallel.

Embodiments, as described above, may be implemented in many different forms of software, firmware, and hardware in the implementations illustrated in the figures. The actual software code or specialized control hardware used to implement embodiments consistent with principles of the invention is not limiting of the invention. Thus, the operation and behavior of the embodiments were described without reference to the specific software code—it being understood that one would be able to design software and control hardware to implement the embodiments based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    providing intrusion detecting protection for a Session Initiation Protocol (SIP)-based device, wherein providing intrusion detecting protection comprises:
        parsing message logs received by the SIP-based device, wherein the parsing includes extracting Internet Protocol (IP) addresses from the message logs, creating a geographical profile based on the IP addresses, and performing a location analysis based on the IP addresses; and
        identifying a call source as an unsolicited marketing attempt based on the parsed message logs.

2. The method of claim 1, further comprising providing identity assurance protection for the SIP-based device including:
performing password cracking for the SIP-based device; and
eliminating spoofed traffic received by the SIP-based device.

3. The method of claim 1, further comprising providing identity assurance protection for the SIP-based device including:
determining supported protocols for the SIP-based device; and
verifying support for one or more identity assurance mechanisms.

4. The method of claim 1, further comprising providing identity assurance protection for the SIP-based device including:
eliminating unauthenticated INVITE messages received by the SIP-based device; and
identifying minimum cryptographic strength for transport layer security (TLS).

5. The method of claim 1, further comprising providing multiple end-points protection for the SIP-based device including:
verifying if the SIP-based device permits a single user account to create multiple simultaneous calls; and
enforcing a threshold on a number of calls that may be generated from an account associated with the single user account.

6. The method of claim 5, wherein providing multiple end-points protection further comprises:
calculating the threshold from usage history of the single user account.

7. The method of claim 1, further comprising providing multiple end-points protection for the SIP-based device including:
enforcing a threshold on a number of registrations that may be performed in a time frame from a user account; and
blocking unauthorized registration attempts with the SIP-based device when the number of registrations exceeds the threshold.

8. The method of claim 1, wherein providing intrusion detecting protection comprises:
determining if an anomaly exists in a usage pattern of the SIP-based device; and
alerting a security event management system when the anomaly exists.

9. The method of claim 1, wherein providing intrusion detecting protection comprises:
optimizing filters to detect theft of service attacks on the SIP-based device; and
eliminating method vulnerabilities of the SIP-based device using behavioral-based techniques or knowledge-based techniques.

10. The method of claim 1, further comprising:
providing identity assurance protection for the SIP-based device; and
providing multiple end-points protection for the SIP-based device.

11. The method of claim 1, wherein providing intrusion detecting protection includes blocking SIP requests forwarded from a SIP proxy that is not an outbound proxy when the SIP request does not include an address in a home domain.

12. A system comprising:
one or more devices including:
a receiver to receive Session Initiation Protocol (SIP) messages in a SIP-based device;
a memory to store the SIP messages in message logs;
a processor to parse the message logs received by the SIP-based device, extract Internet Protocol (IP) addresses from the message logs, perform a location analysis based on the IP addresses, and identify a call source as an unsolicited marketing attempt based on the parsed message.

13. The system of claim 12, wherein the processor is configured to
perform password cracking for the SIP-based device; and
eliminate spoofed traffic received by the SIP-based device.

14. The system of claim 12, wherein the processor is configured to identity assurance protection mechanism:
determine supported protocols for the SIP-based device; and
verify support for one or more of a digest authentication mechanism, a transport layer security (TLS) mechanism, or a secure/multipurpose Internet mail extensions (S/MIME) mechanism.

15. The system of claim 12, wherein the processor is configured to:
eliminate unauthenticated INVITE messages received by the SIP-based device; and
identify minimum cryptographic strength for transport layer security (TLS).

16. The system of claim 12, wherein the processor is configured to:
verify if the SIP-based device permits a single user account to create multiple simultaneous calls; and
enforce a threshold on a number of calls that may be generated from the single user account.

17. The system of claim 16, wherein the processor is configured to:
calculate the threshold from usage history of the single user account.

18. The system of claim 12, wherein the processor is configured to:
enforce a threshold on a number of registrations that may be performed in a time frame from a user account; and
block unauthorized registration attempts with the SIP-based device when the number of registrations exceeds the threshold.

19. The system of claim 12, wherein the processor is configured to:
determine if an anomaly exists in a usage pattern of the SIP-based device; and
alert a security event management system when the anomaly exists.

20. The system of claim 12, wherein the processor is configured to:
optimize filters to detect theft of service attacks on the SIP-based device; and
eliminate method vulnerabilities of the SIP-based device using behavioral-based techniques or knowledge-based techniques.

21. The system of claim 12, wherein the one or more devices are configured to prevent theft of service attacks on the SIP-based device using an identity assurance protection mechanism, a multiple end-points protection mechanism, and an intrusion detecting protection mechanism.

22. The system of claim 12, wherein the processor is configured to SIP requests forwarded from a SIP proxy that is not an outbound proxy when the SIP request does not include an address in a home domain.

23. A system comprising:
one or more devices configured to:

validate, with test environment data, mechanisms that prevent theft of service attacks on a Session Initiation Protocol (SIP)-based device, train the theft of service prevention mechanisms with real environment data, compare results of the validation and the training, and generate a measure of detection performance for the theft of service prevention mechanisms based on the comparison.

24. The system of claim 23, wherein the theft of service prevention mechanisms include one or more of identity assurance protection mechanisms, multiple end-points protection mechanisms, or intrusion detecting protection mechanisms.

25. The system of claim 23, wherein the one or more devices comprise:

a voice over Internet Protocol (VoIP) test bed of SIP-based devices; and one or more SIP servers.

* * * * *